United States Patent [19]
Yu

[11] Patent Number: 5,345,319
[45] Date of Patent: Sep. 6, 1994

[54] LINEAR COLOR CHARGE COUPLED DEVICE FOR IMAGE SENSOR AND METHOD OF DRIVING THE SAME

[75] Inventor: Young J. Yu, Seoul, Rep. of Korea

[73] Assignee: Goldstar Electron Co., Ltd., Rep. of Korea

[21] Appl. No.: 155,456

[22] Filed: Nov. 19, 1993

[51] Int. Cl.$^5$ ............................................. H04N 1/04
[52] U.S. Cl. ................................................... 358/483
[58] Field of Search ............................. 358/482–483, 358/513–514, 500

[56] References Cited

U.S. PATENT DOCUMENTS

| | | | |
|---|---|---|---|
| 4,641,184 | 2/1987 | Alston | 358/513 |
| 4,654,713 | 3/1987 | Boucharlat et al. | 358/483 |
| 4,761,683 | 8/1988 | Matteson et al. | 358/513 |
| 4,866,512 | 9/1989 | Hirosawa et al. | 358/514 |
| 5,025,313 | 6/1991 | Parulski et al. | 358/514 |
| 5,191,409 | 3/1993 | Hamaguchi et al. | 358/483 |

*Primary Examiner*—Stephen Brinich
*Attorney, Agent, or Firm*—Poms, Smith, Lande & Rose

[57] ABSTRACT

A linear color CCD for an image sensor and a method of driving the same. The linear color CCD comprises a photodiode array section for performing a photoelectric conversion operation to produce signal charges corresponding to red, green and blue color signals, the photodiode array section having a first photodiode array for producing the signal charges corresponding to the green color signal, a second photodiode array disposed over the first photodiode array for producing the signal charges corresponding to the red color signal and a third photodiode array disposed under the first photodiode array for producing the signal charges corresponding to the blue color signal, a horizontal CCD analog shift register section having a first horizontal CCD analog shift register disposed between the first and second photodiode arrays to shift the signal charges from the first and second photodiodes horizontally and a second horizontal CCD analog shift register disposed between the first and third photodiode arrays to shift the signal charges from the first and third photodiodes horizontally, and a shift gate section for shifting the signal charges from the photodiode array section to the horizontal CCD analog shift register section upon being turned on.

6 Claims, 4 Drawing Sheets

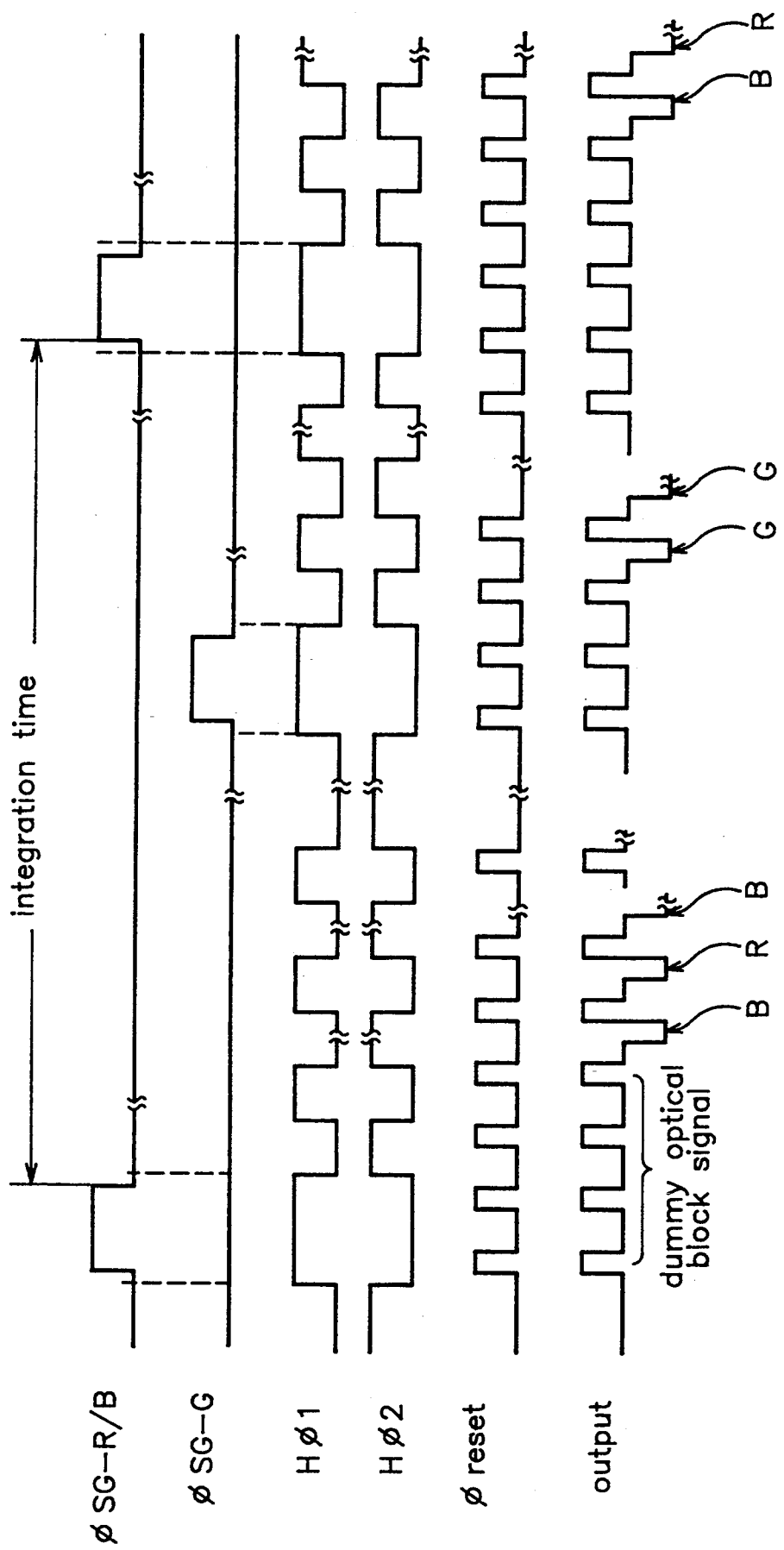

LINEAR COLOR CHARGE COUPLED DEVICE FOR IMAGE SENSOR AND METHOD OF DRIVING THE SAME

BACKGROUND OF THE INVENTION

The present invention relates in general to a charge coupled device (CCD) for an image sensor, and more particularly to a linear color CCD suitable for sensing a color image and a method of driving the same.

Referring to FIG. 1, there is shown a construction of a conventional linear color CCD for an image sensor. As shown in this drawing, the conventional linear color CCD comprises three CCD sets corresponding to three primary colors of light, red, green and blue colors, respectively.

Each of the three CCD sets includes a photodiode (PD) array 3, 4 or 5, a pair of shift gates 2 disposed on the upper and lower surfaces of the PD array 3, 4 or 5, respectively, and a pair of horizontal CCD (HCCD) analog shift registers 1. One of the HCCD analog shift registers 1 is disposed over the upper shift gate 2 and the other is disposed under the lower shift gate 2. Each of floating diffusion (FD) elements 6 is connected to an output of a corresponding one of the CCD sets. Each of sensing amplifiers 7 is connected to an output of a corresponding one of the FD elements 6.

The operation of the conventional linear color CCD with the above-mentioned construction will hereinafter be described.

In each of the CCD sets, signal charges produced by photoelectric conversion of PDs in the PD array 3, 4 or 5 are shifted to the HCCD analog shift registers 1 when the shift gates 2 are turned on. At this time, the shifting of the signal charges from the PDs in the PD array 3, 4 or 5 through the turned-on shift gates 2 is performed in such a zigzag manner that the signal charges from the PDs of the odd number are shifted to the lower HCCD analog shift register 1 and the signal charges from the PDs of the even number are shifted to the upper HCCD analog shift register 1. The upper and lower HCCD analog shift registers 1 shift the signal charges from the PDs in the PD array 3, 4 or 5 again to the right in response to HCCD clock signals. Then, the FD element 6 and the sensing amplifier 7 cooperate to produce a signal based on the signal charges from the upper and lower HCCD analog shift registers 1.

The three linear color CCD sets corresponding respectively to the red, green and blue colors have the same construction except color filter application and, thus, the operations thereof are substantially the same. With the same construction, the three linear color CCD sets output red (R), green (G) and blue (B) color signals, respectively.

However, the above-mentioned conventional linear color CCD has a disadvantage in that the construction is more complex by three times than that of a linear black and white CCD since it requires two HCCD analog shift registers, one FD element and one sensing amplifier in the unit of one photodiode array. Also, a space is large between the adjacent photodiode arrays because two shift gates and two HCCD analog shift registers are present therebetween. This results in a degradation in a vertical color separation.

SUMMARY OF THE INVENTION

Therefore, the present invention has been made in view of the above problems, and it is an object of the present invention to provide a linear color CCD for an image sensor with a simple construction and enhanced color separation and resolution and a method of driving the same.

In accordance with one aspect of the present invention, there is provided a linear color CCD for an image sensor comprising photodiode array means for performing a photoelectric conversion operation to produce signal charges corresponding to red, green and blue color signals, said photodiode array means having a first photodiode array for producing the signal charges corresponding to the green color signal, a second photodiode array disposed over said first photodiode array for producing the signal charges corresponding to the red color signal and a third photodiode array disposed under said first photodiode array for producing the signal charges corresponding to the blue color signal; horizontal CCD analog shift register means for shifting the signal charges from said photodiode array means horizontally, said horizontal CCD analog shift register means having a first horizontal CCD analog shift register disposed between said first and second photodiode arrays to shift the signal charges from said first and second photodiodes horizontally and a second horizontal CCD analog shift register disposed between said first and third photodiode arrays to shift the signal charges from said first and third photodiodes horizontally; and shift gate means for shifting the signal charges from said photodiode array means to said horizontal CCD analog shift register means upon being turned on, said shift gate means having a first shift gate disposed over said first horizontal CCD analog shift register to shift the signal charges from said second photodiode array to said first horizontal CCD analog shift register upon being turned on, a second shift gate disposed under said first horizontal CCD analog shift register to shift the signal charges from said first photodiode array to said first horizontal CCD analog shift register upon being turned on, a third shift gate disposed over said second horizontal CCD analog shift register to shift the signal charges from said first photodiode array to said second horizontal CCD analog shift register upon being turned on and a fourth shift gate disposed under said second horizontal CCD analog shift register to shift the signal charges from said third photodiode array to said second horizontal CCD analog shift register upon being turned on.

In accordance with another aspect of the present invention, there is provided a method of driving a linear color CCD for an image sensor which comprises photodiode array means for performing a photoelectric conversion operation to produce signal charges corresponding to red, green and blue color signals, said photodiode array means having a first photodiode array for producing the signal charges corresponding to the green color signal, a second photodiode array disposed over said first photodiode array for producing the signal charges corresponding to the red color signal and a third photodiode array disposed under said first photodiode array for producing the signal charges corresponding to the blue color signal, horizontal CCD analog shift register means for shifting the signal charges from said photodiode array means horizontally and shift gate means for shifting the signal charges from said photodiode array means to said horizontal CCD analog shift register means upon being turned on, comprising the steps of extracting the signal charges from said second and third photodiode arrays and then the signal charges from said first photodiode array or extracting the signal charges from said first photodiode array and then the signal charges from said second and third photodiode arrays.

BRIEF DESCRIPTION OF THE DRAWINGS

The above and other objects, features and advantages of the present invention will be more clearly understood from the following detailed description taken in conjunction with the accompanying drawings, in which:

FIG. 4 is a timing diagram of signals in the linear color CCD in FIG. 2.

DETAILED DESCRIPTION OF THE PREFERRED EMBODIMENT

Figure 1:
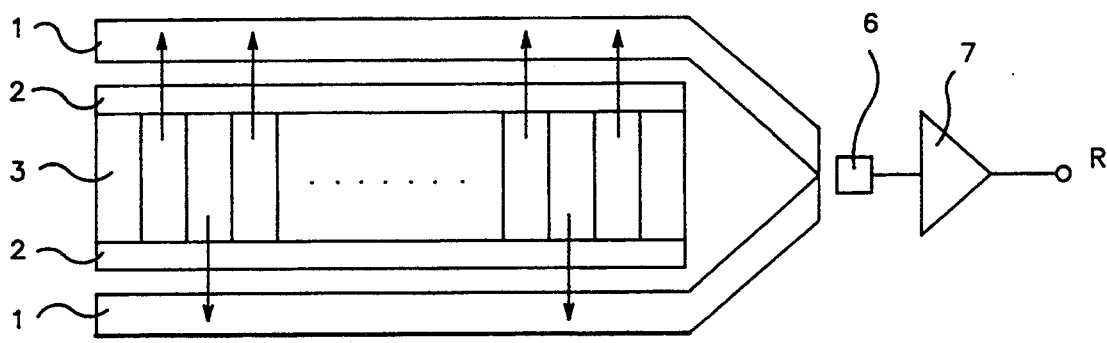
FIG. 1 is a schematic diagram illustrating a construction of a conventional linear color CCD for an image sensor.
Figure 1:
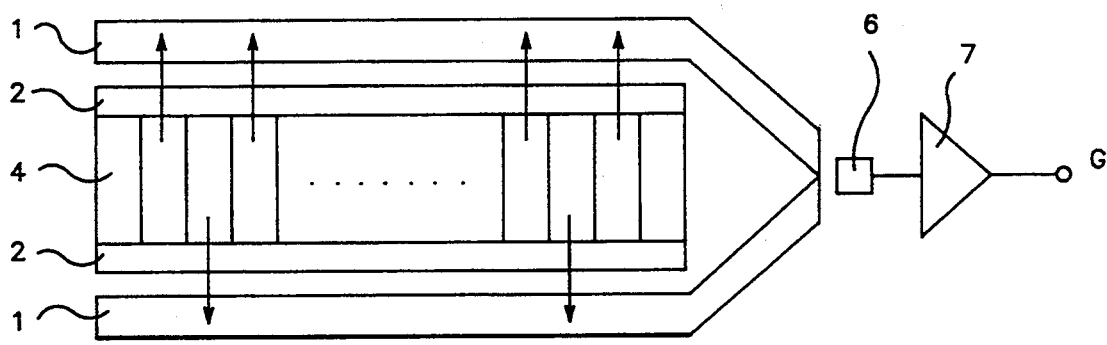
Figure 1:
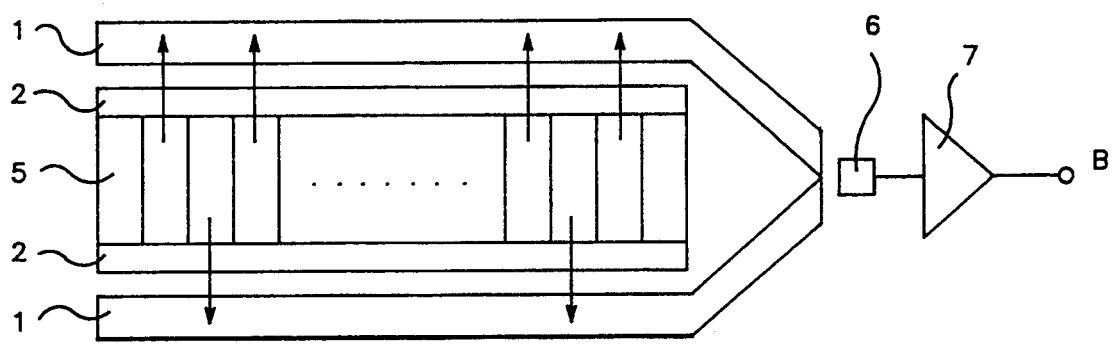
Figure 2:
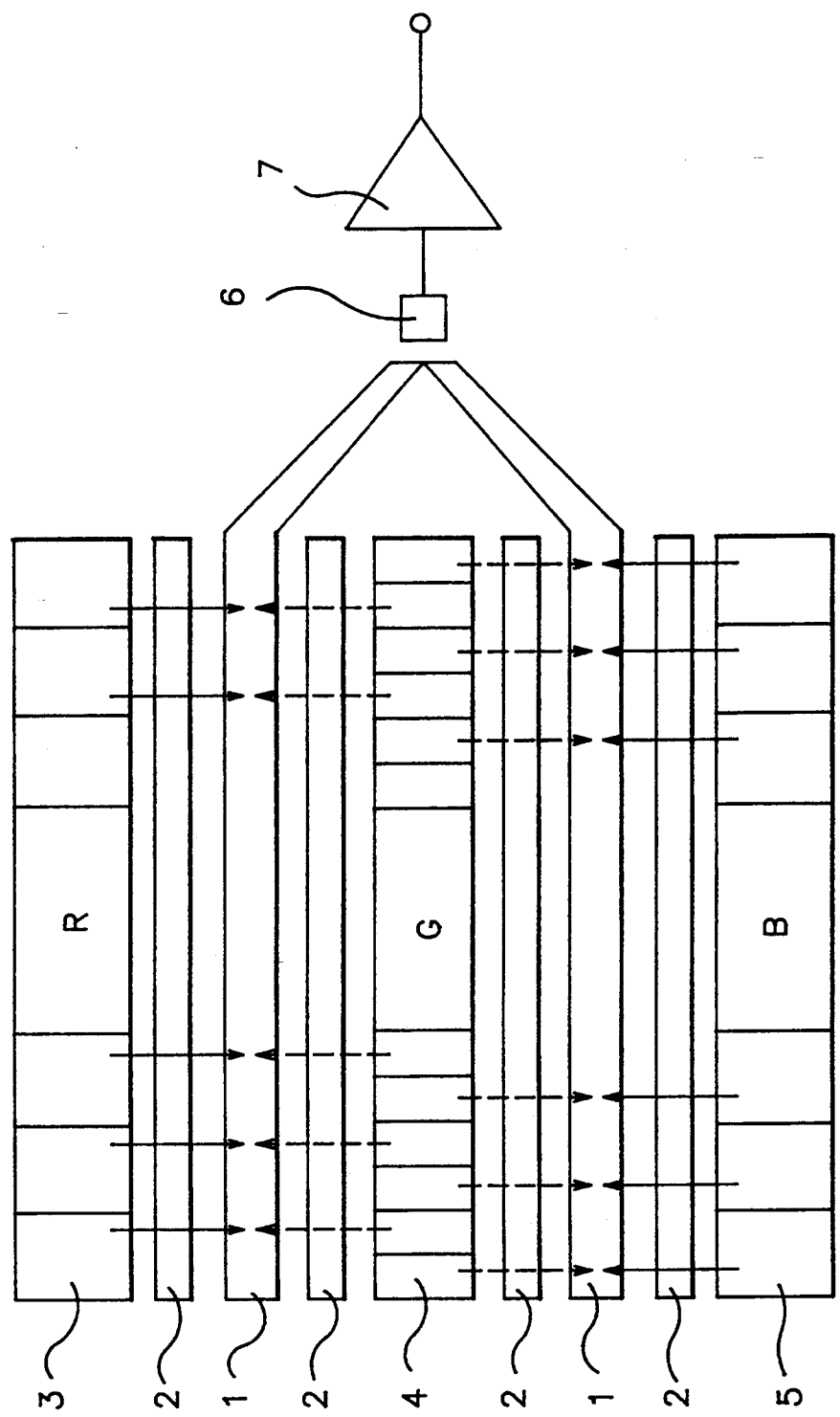
FIG. 2 is a schematic diagram illustrating a construction of a linear color CCD for an image sensor in accordance with the present invention.

Referring to FIG. 2, there is shown a construction of a linear color CCD for an image sensor in accordance with the present invention. As shown in this drawing, the linear color CCD comprises a PD array 40 for producing signal charges corresponding to a green color signal, a PD array 30 disposed over the PD array 40 for producing signal charges corresponding to a red color signal and a PD array 50 disposed under the PD array 40 for producing signal charges corresponding to a blue color signal.

The linear color CCD also comprises a pair of HCCD analog shift registers 10. One of the HCCD analog shift registers 10 is disposed between the PD arrays 30 and 40 and the other is disposed between the PD arrays 40 and 50.

Also, the linear color CCD comprises four shift gates 20. Two of the shift gates 20 are disposed over and under one of the HCCD analog shift registers 10, respectively. The remaining two of the shift gates 20 are disposed over and under the other of the HCCD analog shift registers 10, respectively.

Each of the HCCD analog shift registers 10 may typically include a 2-phase dual polysilicon structure.

Figure 3:
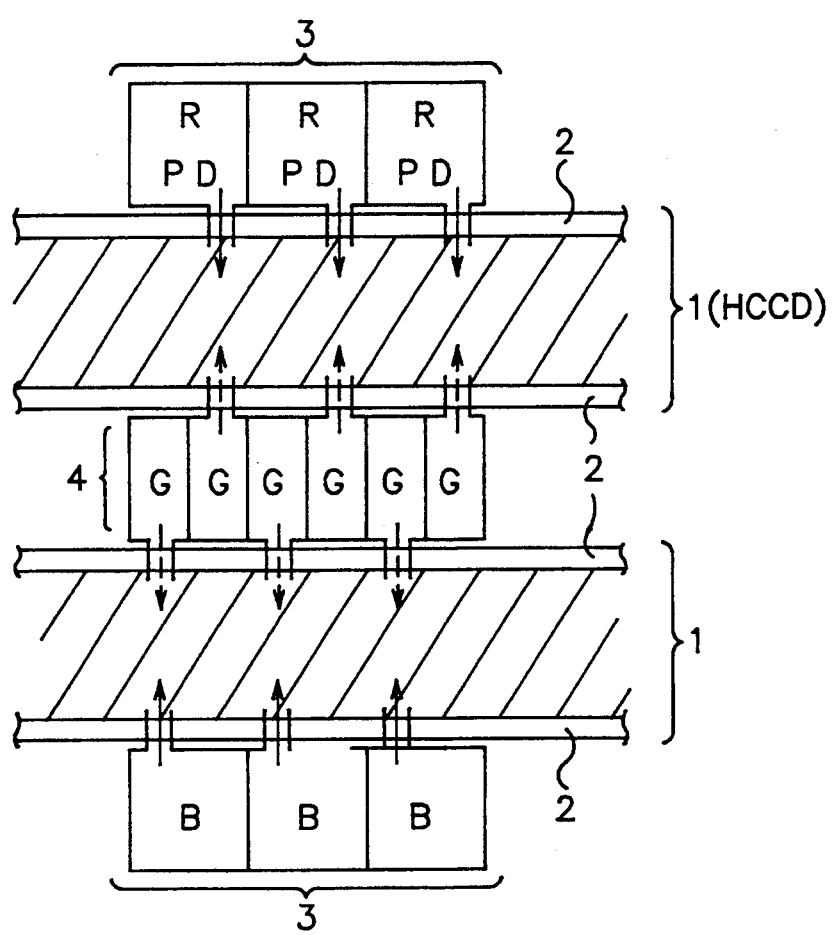
FIG. 3 is a detailed diagram illustrating a part of the linear color CCD in FIG. 2.

Referring to FIG. 3, there is shown a part of the linear color CCD in FIG. 2. Each of PDs in the PD array 40 has a horizontal length of half that of each of PDs in the PD arrays 30 and 50.

Each of the PDs in the PD array 40 has a charge output port disposed on a vertical line at the center thereof. Each of the PDs in the PD arrays 30 and 50 has a charge output port disposed apart from a vertical line at the center thereof. Namely, seeing at a FD element 60, the charge output port of each of the PDs in the PD array 30 is disposed at the right side from the central vertical line, whereas the charge output port of each of the PDs in the PD array 50 is disposed at the left side from the central vertical line. As a result, the charge output port of each of the PDs in the PD arrays 30 and 50 is aligned with that of each of the PDs in the PD array 40.

The operation of the linear color CCD with the abovementioned construction in accordance with the present invention will hereinafter be described in detail.

Signal charges produced by photoelectric conversion of the PDs in the PD arrays 30 and 50 are integrated for a predetermined time period and then shifted to the HCCD analog shift registers 10 as shown by the arrows in FIG. 2 when the shift gates 20 are turned on as shown by the reference numeral QSG-R/B in FIG. 4. The HCCD analog shift registers 10 shift the signal charges from the PDs in the PD arrays 30 and 50 horizontally to the FD element 60 in response to HCCD clock signals HQ1 and HQ2. In response to a reset clock as shown in FIG. 4, a sensing amplifier 70 amplifies the output of the FD element 60 and, thus, alternately outputs blue and red color signals as voltage signals as shown by the reference numeral OUTPUT in FIG. 4.

Then, when the shift gates 20 are turned on as shown by the reference numeral QSG-G in FIG. 4, signal charges from the PDs in the PD array 40 are alternately shifted to the HCCD analog shift registers 10 in a zigzag manner as shown by the arrows in FIG. 2. Namely, the signal charges from the PDs of the odd number are shifted to the lower HCCD analog shift register 10 and the signal charges from the PDs of the even number are shifted to the upper HCCD analog shift register 10. The HCCD analog shift registers 10 shift the signal charges from the PDs in the PD array 40 horizontally to the FD element 60 in response to the HCCD clock signals HQ1 and HQ2. In response to the reset clock as shown in FIG. 4, the sensing amplifier 70 amplifies the output of the FD element 60 and, thus, outputs a green color signal as a voltage signal as shown by the reference numeral OUTPUT in FIG. 4.

Each of the PDs in the PD array 40 has the horizontal length of half that of each of the PDs in the PD arrays 30 and 50, whereas having the same vertical length as that of each of the PDs in the PD arrays 30 and 50. Also, the PDs in the PD array 40 are larger in number than those in the PD array 30 or 50. These have the effect of making a resolution of a 20 luminance signal high.

It is common that human's eyes have a resolution low with respect to the color signal and high with respect to the luminance signal representing light and darkness. In this connection, it is preferred to make the resolution high by reducing a size of each PD in the green color PD array concerned with the luminance signal and increasing a size of each PD in the red and blue color PD arrays, rather than reducing the size of each PD in all the red, green and blue color PD arrays and increasing the number of the PDs. This has the effect of making the construction simple in addition to the increase in the resolution.

As apparent from the above description, according to the present invention, the number of the HCCD analog shift registers, the shift gates, the FD elements and the sensing amplifiers can significantly be reduced as compared with that in the conventional linear color CCD, resulting in a simplification in the construction. Also, a space is small between the adjacent PD arrays, resulting in an increase in a vertical color separation. Further, each of the PDs in the green color PD array has the horizontal length of half that of each of the PDs in the red and blue color PD arrays. This has the effect of increasing the resolution by at least twice that in the conventional linear color CCD.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear color CCD for an image sensor comprising:

photodiode array means for performing a photoelectric conversion operation to produce signal charges corresponding to red, green and blue color signals, said photodiode array means having a first photodiode array for producing the signal charges corresponding to the green color signal, a second photodiode array disposed over said first photodiode array for producing the signal charges corresponding to the red color signal and a third photodiode array disposed under said first photodiode array for producing the signal charges corresponding to the blue color signal;

horizontal CCD analog shift register means for shifting the signal charges from said photodiode array means horizontally, said horizontal CCD analog shift register means having a first horizontal CCD analog shift register disposed between said first and second photodiode arrays to shift the signal charges from said first and second photodiodes horizontally and a second horizontal CCD analog shift register disposed between said first and third photodiode arrays to shift the signal charges from said first and third photodiodes horizontally; and shift gate means for shifting the signal charges from said photodiode array means to said horizontal CCD analog shift register means upon being turned on, said shift gate means having a first shift gate disposed over said first horizontal CCD analog shift register to shift the signal charges from said second photodiode array to said first horizontal CCD analog shift register upon being turned on, a second shift gate disposed under said first horizontal CCD analog shift register to shift the signal charges from said first photodiode array to said first horizontal CCD analog shift register upon being turned on, a third shift gate disposed over said second horizontal CCD analog shift register to shift the signal charges from said first photodiode array to said second horizontal CCD analog shift register upon being turned on and a fourth shift gate disposed under said second horizontal CCD analog shift register to shift the signal charges from said third photodiode array to said second horizontal CCD analog shift register upon being turned on.

2. A linear color CCD for an image sensor as set forth in claim 1, wherein each of said first to third photodiode arrays has a plurality of photodiodes, each of said photodiodes in said first photodiode array having a horizontal length of half that of each of said photodiodes in said second and third photodiode arrays.

3. A linear color CCD for an image sensor as set forth in claim 1, wherein the signal charges from said first photodiode array are alternately shifted to said first and second HCCD analog shift registers in a zigzag manner.

4. A linear color CCD for an image sensor as set forth in claim 1, wherein the signal charges from said second photodiode array are shifted to said first HCCD analog shift register in a single direction and the signal charges from said third photodiode array are shifted to said second HCCD analog shift register in a single direction.

5. A linear color CCD for an image sensor as set forth in claim 1, wherein each of said first to third photodiode arrays has a plurality of photodiodes, each of said photodiodes having a charge output port, said charge output port of each of said photodiodes in 'said first photodiode array being aligned on a vertical line with that of each of said photodiodes in said second and third photodiode arrays and facing to each other.

6. A method of driving a linear color CCD for an image sensor which comprises photodiode array means for performing a photoelectric conversion operation to produce signal charges corresponding to red-, green and blue color signals, said photodiode array means having a first photodiode array for producing the signal charges corresponding to the green color signal, a second photodiode array disposed over said first photodiode array for producing the signal charges corresponding to the red color signal and a third photodiode array disposed under said first photodiode array for producing the signal charges corresponding to the blue color signal, horizontal CCD analog shift register means for shifting the signal charges from said photodiode array means horizontally and shift gate means for shifting the signal charges from said photodiode array means to said horizontal CCD analog shift register means upon being turned on, comprising the steps of:

extracting the signal charges from said second and third photodiode arrays and then the signal charges from said first photodiode array or extracting the signal charges from said first photodiode array and then the signal charges from said second and third photodiode arrays.

* * * * *